Sept. 9, 1941.                R. E. CROSS                2,255,651
                            MILLING MACHINE
                          Filed Jan. 5, 1940              9 Sheets-Sheet 1

INVENTOR
                          BY    Ralph E. Cross.
                                    ATTORNEY INVENTOR
Ralph E. Cross.
BY
ATTORNEY Sept. 9, 1941.   R. E. CROSS   2,255,651
MILLING MACHINE
Filed Jan. 5, 1940   9 Sheets-Sheet 7

INVENTOR
Ralph E. Cross.
BY
ATTORNEY

Sept. 9, 1941.　　　　R. E. CROSS　　　　2,255,651
MILLING MACHINE
Filed Jan. 5, 1940　　　　9 Sheets-Sheet 8

INVENTOR
Ralph E. Cross.
BY
ATTORNEY

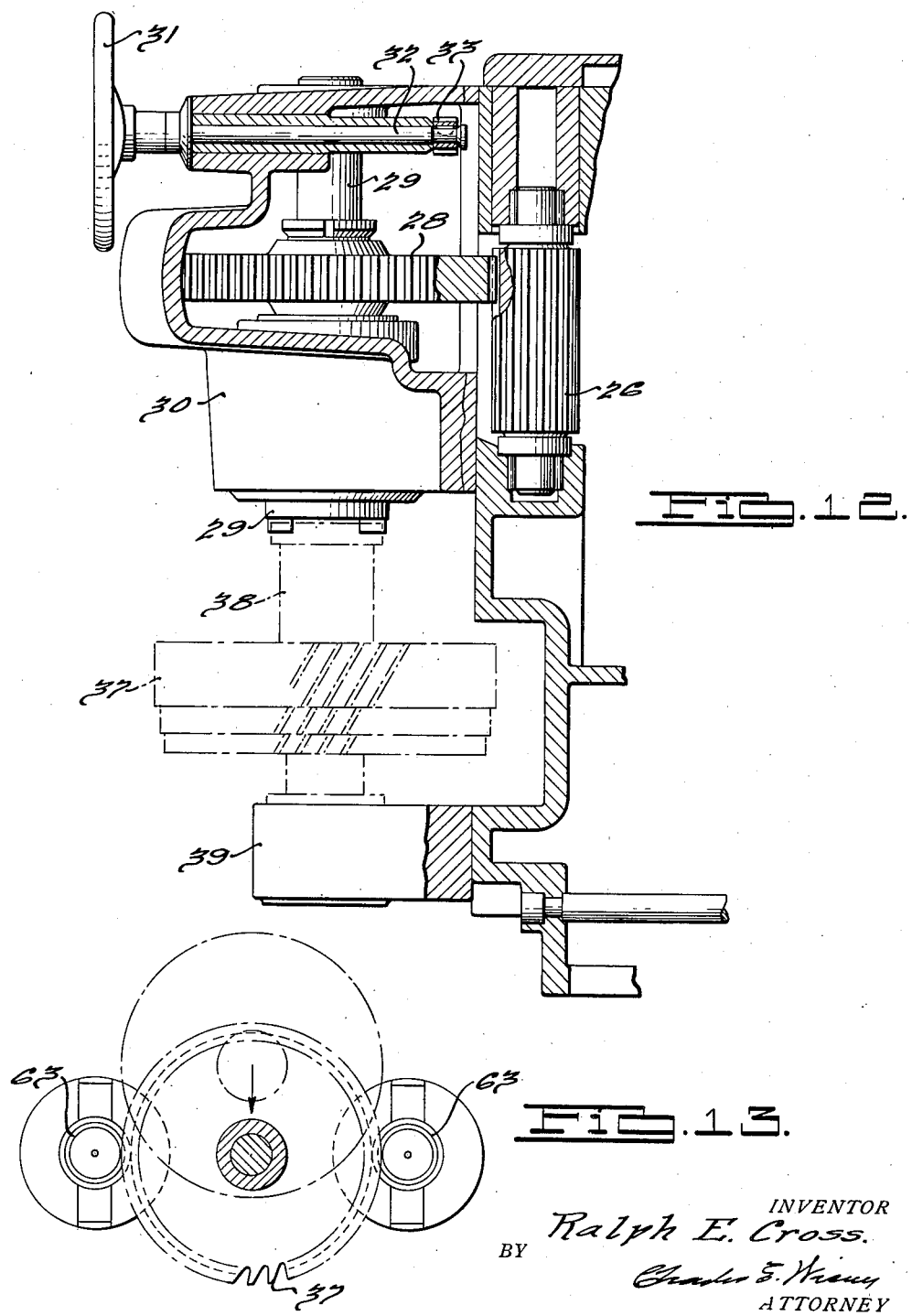

Patented Sept. 9, 1941

2,255,651

UNITED STATES PATENT OFFICE 2,255,651

MILLING MACHINE

Ralph E. Cross, Detroit, Mich.

Application January 5, 1940, Serial No. 312,559

11 Claims. (Cl. 90—15)

This invention relates to milling machines and the object of the invention is to provide a milling machine having a rotary milling cutter or other surface reducing means arranged to be moved between two pieces of rotating work to mill both pieces simultaneously to the desired size.

One of the particular objects of the invention is to provide a milling machine arranged to turn out two pieces of work simultaneously with one cutter.

A further object of the invention is to provide a milling machine having a circular rotating cutter and provided with two rotating work heads on which the work to be milled is secured, the milling cutter being movable between the two pieces of rotating work and arranged to mill the said two pieces to the desired size as the axis of the milling cutter is moved to a line between the axes of the two pieces of work.

Another object of the invention is to provide a machine in which the axes of the two pieces of work may be accurately spaced so that as the milling cutter is moved between the two work pieces they will be milled to exact size.

A further object of the invention is to provide a milling machine in which the work holding heads may be moved apart or toward each other to accurately position the work in relation to the milling cutter and arranged so that the milling cutter may be raised or lowered in relation to the work.

These objects and the several novel features of the invention are hereinafter more fully described and claimed and the preferred form of construction by which these objects are attained is shown in the accompanying drawings in which—

Fig. 12 is a section taken on line 12—12 of Fig. 11.

Fig. 13 is a diagrammatic view showing the milling cutter moved to final position between the pieces being milled.

Figure 1:
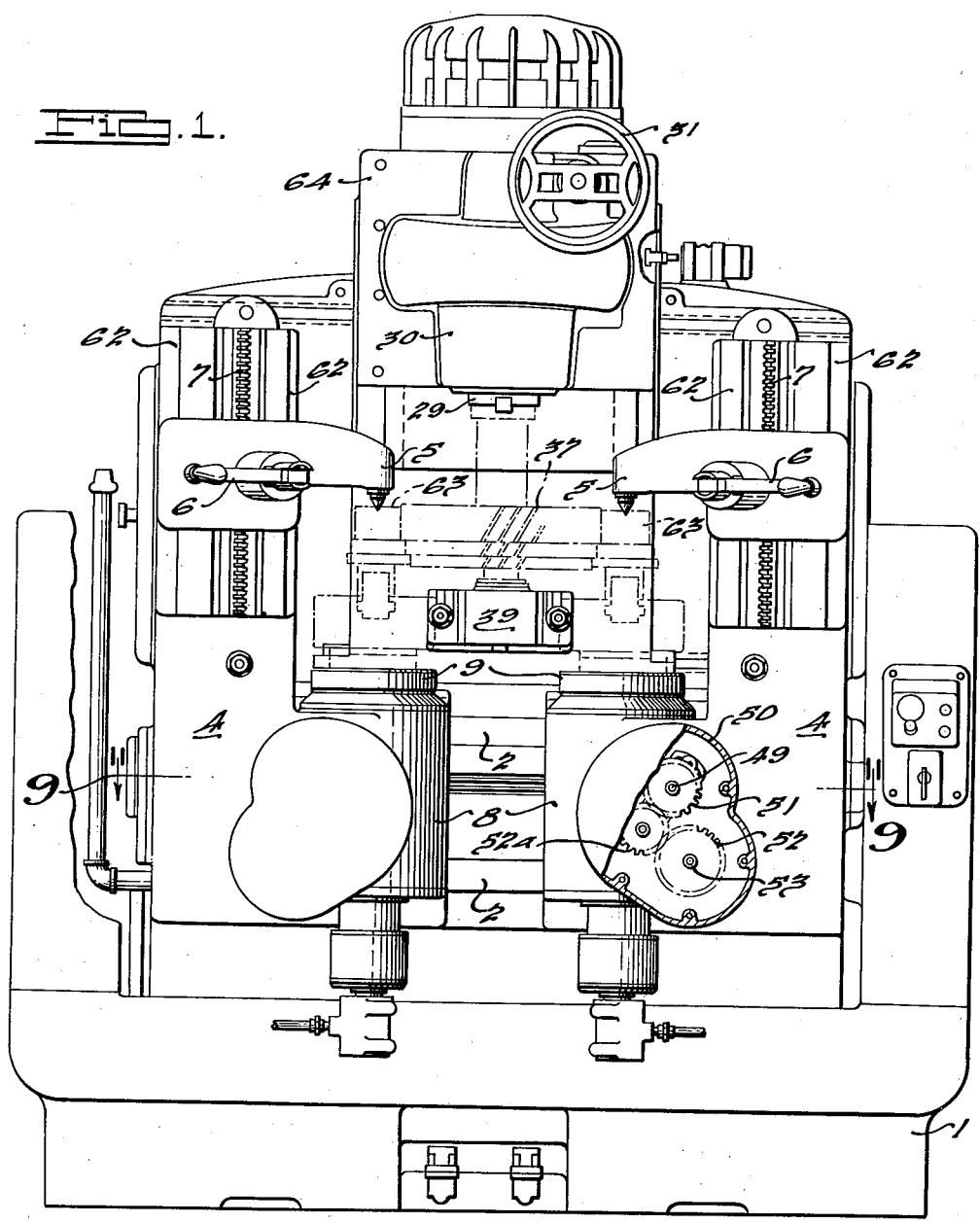
Fig. 1 is a front elevation of a milling machine embodying my invention.
Figure 3:
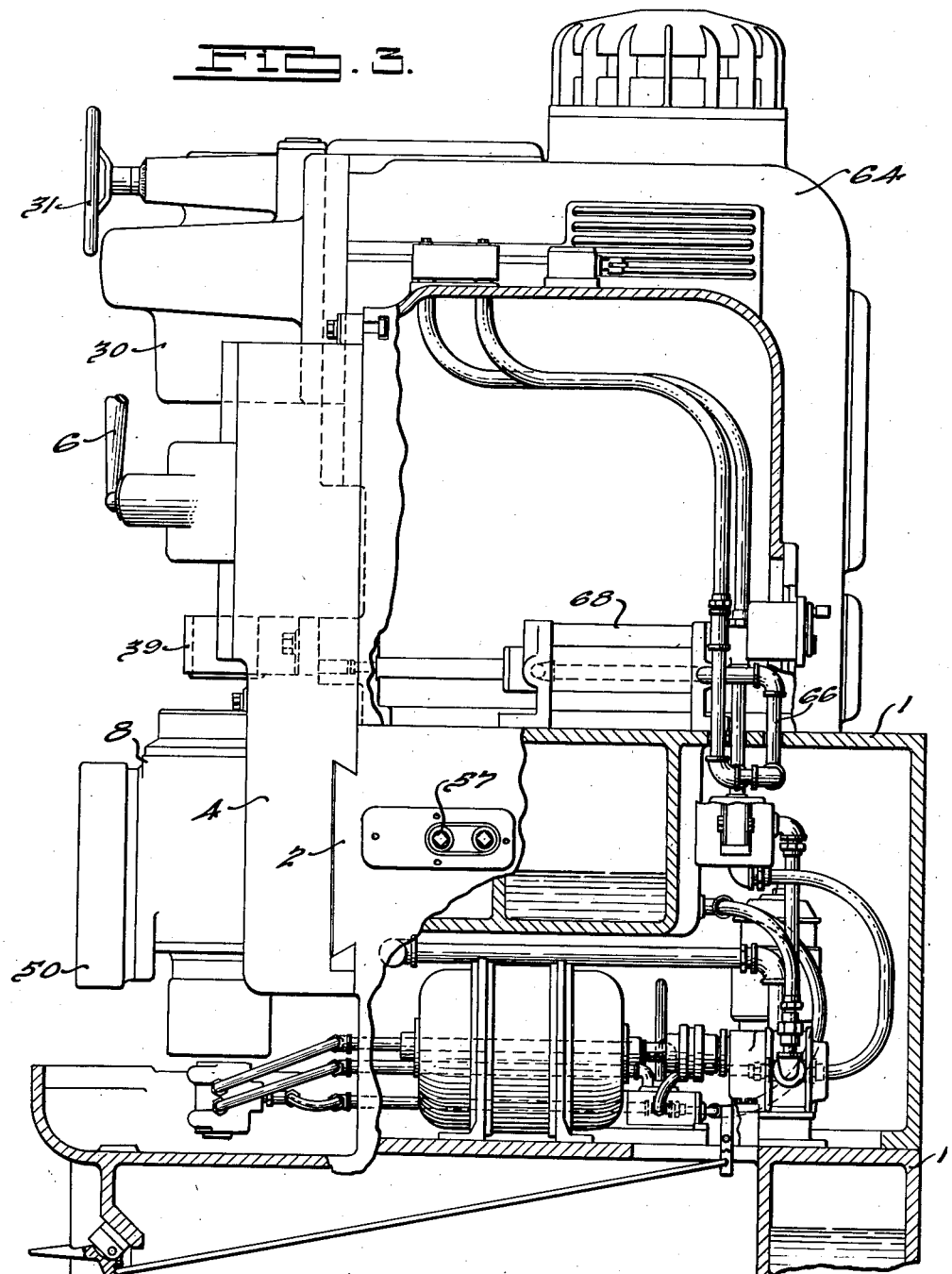
Fig. 3 is a right hand side elevation of the milling machine partly broken away to show the construction.

The machine comprises a base 1 shown in Figs. 1 and 3 and this base 1 is provided with ways 2 on which the work holding heads 4 are mounted. These heads are movable transversely of the base and are each provided as shown in Fig. 1 with a tail stock 5 which is adjustable vertically by means of the crank 6 provided with a gear meshing with the rack 7. Also mounted on each member 4 is a casing 8 for the work holding spindle provided with rotating upper ends 9 to which the work may be secured as shown in dotted lines in Fig. 1.

Figure 8:
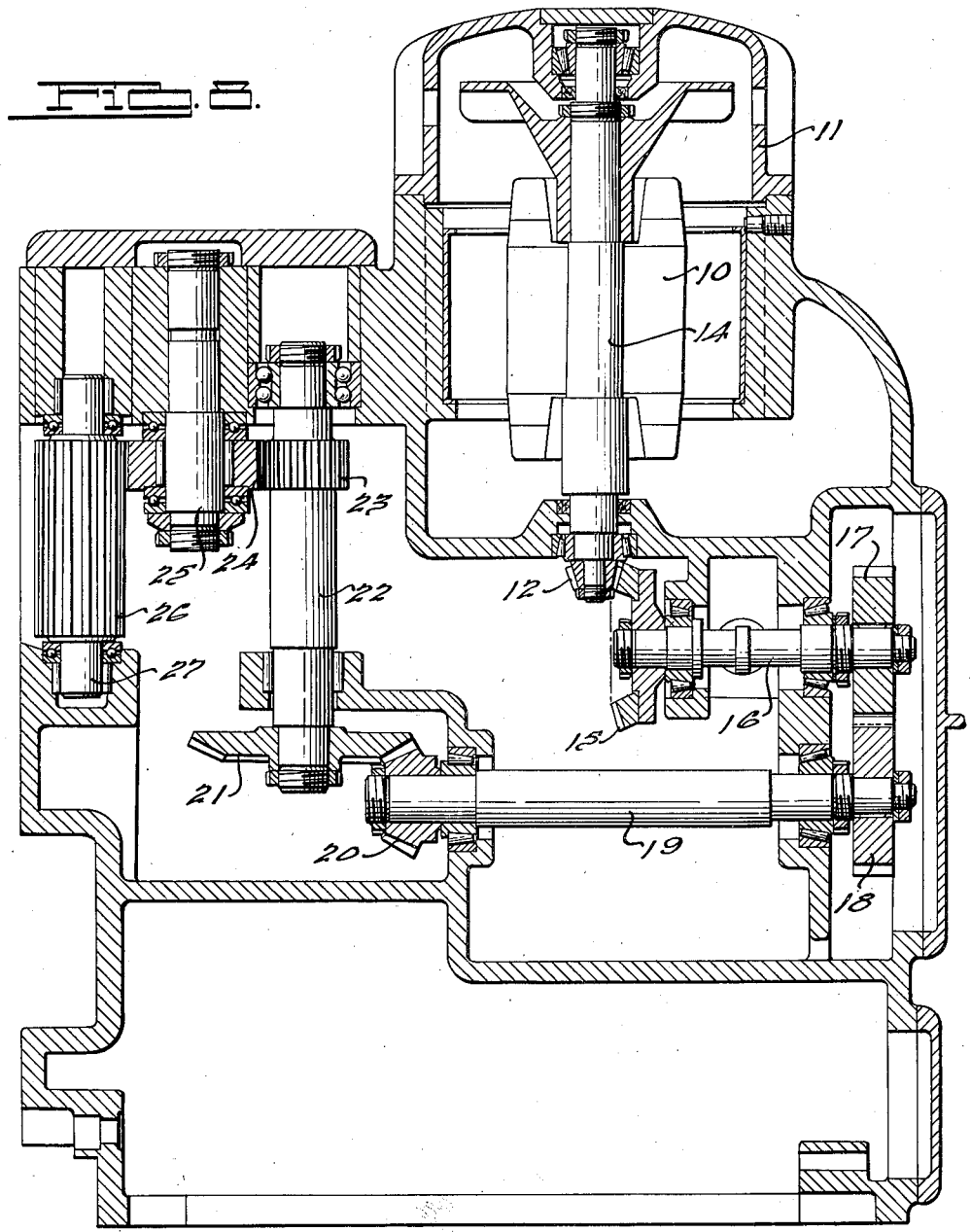
Fig. 8 is a section taken on line 8—8 of Fig. 2.

The two rotating spindles 9 may be provided with chucks for holding the work and the tail stocks 5 provide a support for the upper ends of the work. By this arrangement, the two pieces of work are spaced apart on rotating spindles so that a rotating cutter may be moved between the two pieces of work and will cut the same simultaneously. The drive for the rotating cutter is shown more particularly in Fig. 8 and comprises an electric motor 10 mounted in the upper housing portion 11 and having a gear 12 on the lower end of the motor shaft 14. This gear 12 meshes with the gear 15 on the counter-shaft 16 and this counter-shaft 16 is provided with a gear 17 on the end thereof meshing with the gear 18 on the shaft 19. At the end opposite the gear 18, the shaft 19 is provided with a gear 20 which meshes with the gear 21 on the shaft 22. This shaft 22 is also provided with a gear 23 thereon meshing with the gear 24 on the shaft 25 and the gear on the shaft 25 meshes with a long gear 26 mounted on a shaft 27 which is rotatably mounted in bearings in the housing as shown. The long gear 26 is also shown in Fig. 12 and meshes with a gear 28 on the vertical shaft 29. This gear 28 and shaft 29 is enclosed in a housing 30 which is movable vertically on the main housing by means of a hand wheel 31 for rotating a shaft 32 to which a pinion 33 is attached. This pinion 33 as shown in Fig. 11 meshes with a gear 34 in the screw shaft 35 and by turning this pinion 33 the screw shaft is rotated which threads the shaft into or out of the threaded block 36 on the main body to raise or lower the housing 30.

The lower end of the shaft 29 is arranged to rotate with a rotating cutter 37 shown in dotted lines in Fig. 12 and the spindle 38 on which it is mounted, and the lower end of the spindle 38 may be rotatably mounted in the portion 39 of the housing 30 which is connected to and moves up or down with the housing. By means of the long gear 26 the gear 28 will remain in mesh therewith upon vertical movement of the cutter head in either direction and will maintain the driving connection to the cutter head.

Figure 5:
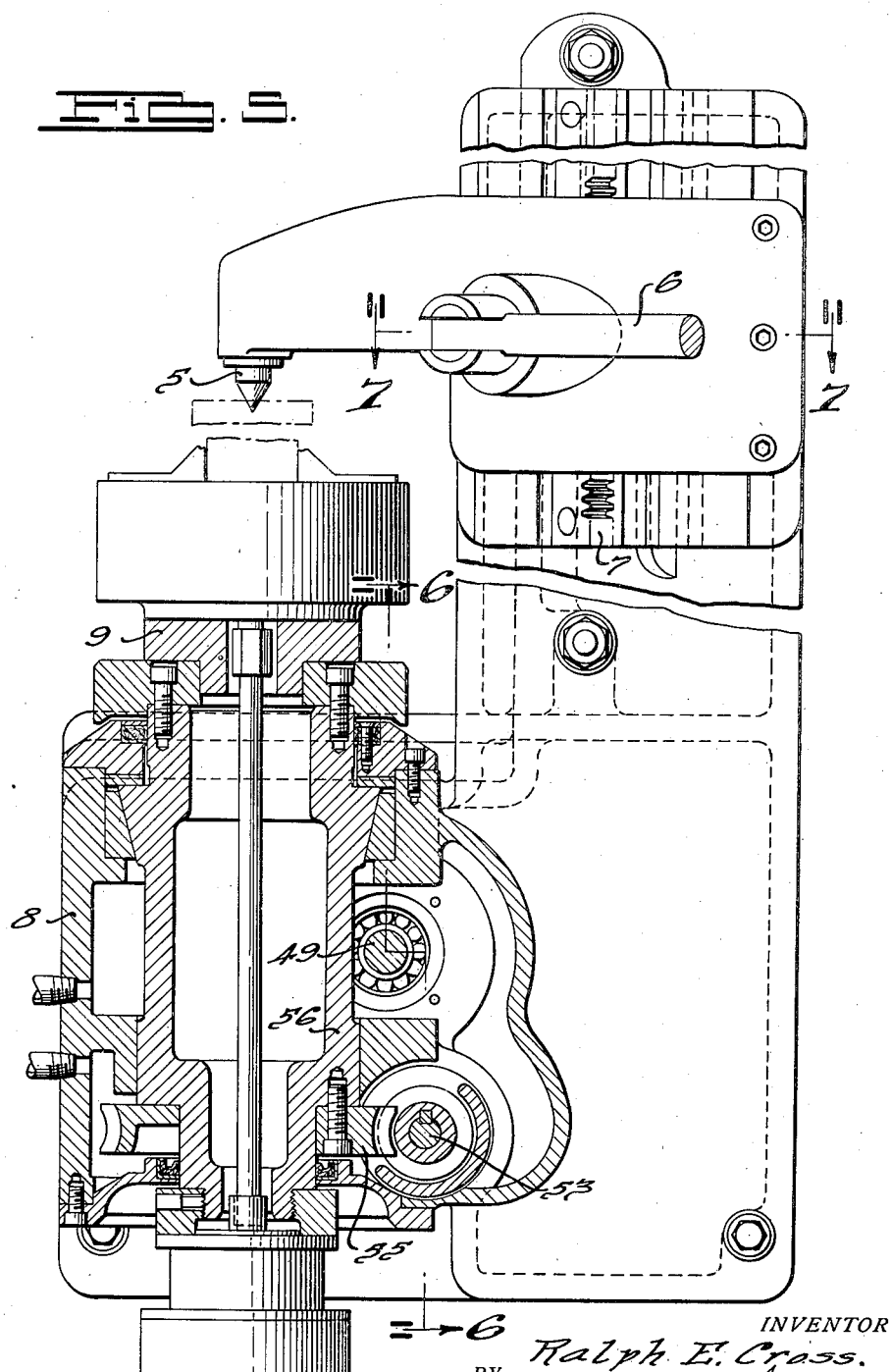
Fig. 5 is a detail showing the right hand work holder and spindle in section.
Figure 9:
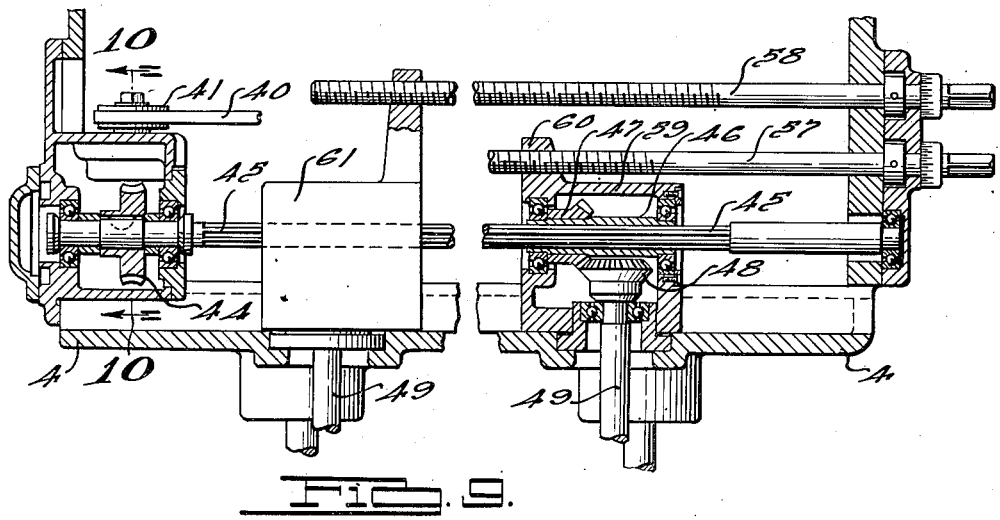
Fig. 9 is a section taken on line 9—9 of Fig. 1.
Figures 10, 11:
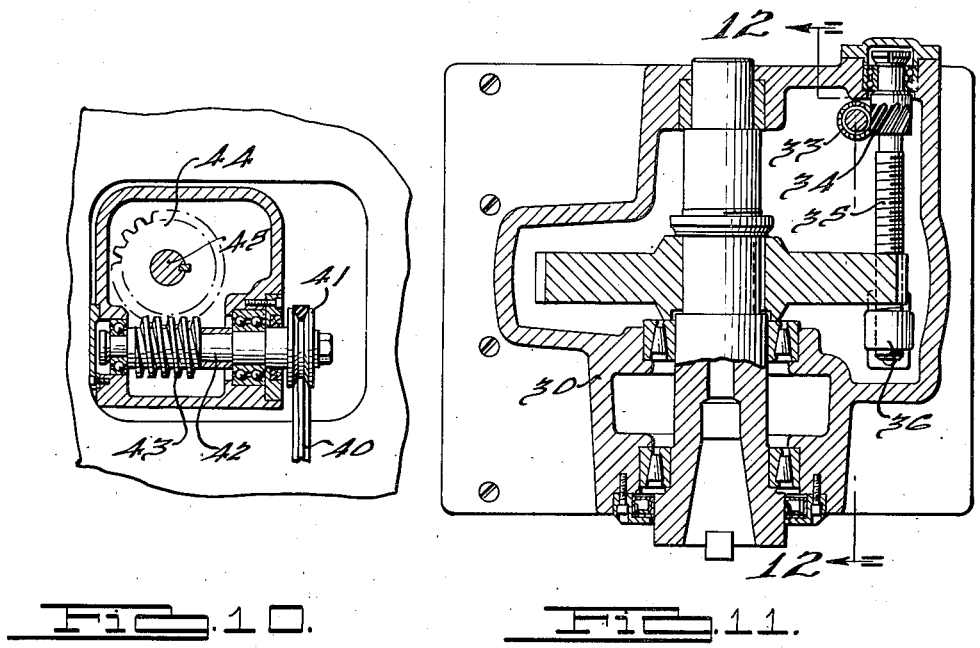
Fig. 10 is a section taken on line 10—10 of Fig. 9.
Fig. 11 is a section taken on line 11—11 of Fig. 2.

The drive to the work holding spindles or heads is through means of a belt 40 shown in Figs. 9 and 10 which rotates a pulley 41 connected to a shaft 42. A worm 43 is secured to this shaft 42 as shown in Fig. 10 and meshes with a worm gear 44 which is secured to the splined shaft 45. This gear 44 rotates the splined shaft 45 which extends through a sleeve 46 to which a gear 47 is secured. This gear 47 meshes with a gear 48 on the shaft 49 and these two shafts are rotated in the same manner from the splined shaft. The shaft 49 shown in Fig. 9 extends through the housing 8 and into a housing 50 shown in Figs. 1 and 3. The gear 51 is secured to the end of this shaft as shown in Fig. 1 and an idler gear 52A is provided which meshes with the gear 51 and with the gear 52 on the shaft 53 as shown in Figs. 1 and 5. This arrangement is shown more particularly in Fig. 6 and the shaft 53 as shown in Figs. 5 and 6 is provided with a worm 54 mounted thereon which meshes with a worm gear 55 shown in Fig. 5 and this worm gear is secured to the work spindle 56.

Figure 6:
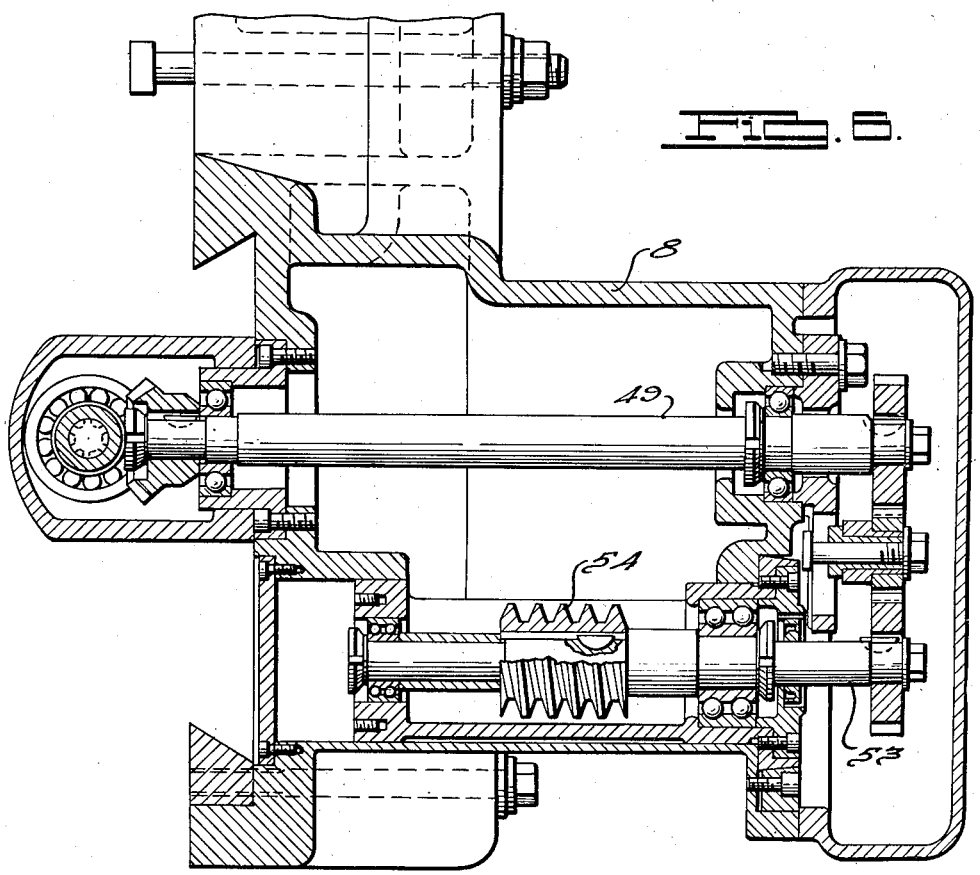
Fig. 6 is an enlarged section taken on line 6—6 of Fig. 5.
Figure 7:
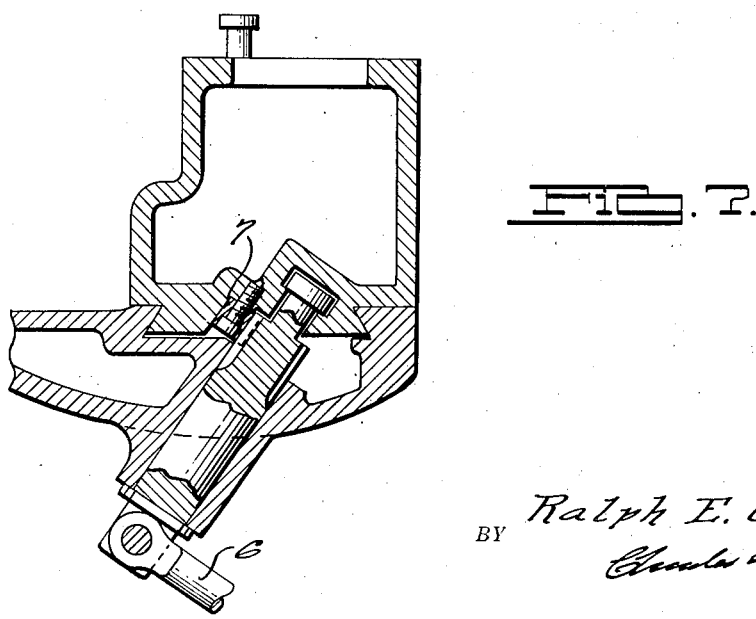
Fig. 7 is a section taken on line 7—7 of Fig. 5.

By this arrangement rotation of the gear 47 by the splined shaft 45 rotates the gear 48 and shaft 49 shown in Fig. 9 and this shaft 49 rotates the gears 52a and 52 thus rotating the shaft 53 and worm 54 to turn the spindle 56 as will be understood from Figs. 5 and 6. The spindle housing 8 and plate 4 are integral and slide horizontally on the ways 2 shown in Fig. 1. There are two plates 4 as will be understood from Fig. 9 which are movable toward or away from each other to bring the work supports to the desired position. This adjustment of the spindles is accomplished by means of a screw shaft 57 for the right spindle shown in Fig. 9 and a screw shaft 58 for the left spindle. The splined sleeve 46 to which the gear 47 is secured is mounted in roller bearings in a housing 59 having an upwardly extending lug 60 through which the screw shaft 57 extends. By turning this screw shaft 57 from the exterior as will be understood from Fig. 3 this screw shaft will move the housing 59 horizontally along the splined shaft 45. Movement of this housing moves the plate 4 on the ways 2 thus moving the entire spindle housing and integral part 4 to the desired extent. Rotation of the screw shaft 58 moves the housing 61 in the same manner and as these two parts 4 are separate parts as will be understood from Fig. 1 the spindle housings may be thus moved horizontally in either direction to the desired extent. The rack 7 is mounted on the portion 4 and the tail stock 5 is movable vertically on ways 62 which are also secured to and movable with the members 4.

As will be understood from Figs. 1 and 5, the work 63 is mounted on the upper end of the spindle 56 and the tail stock 5 centers the work at the upper end. The position of the work and cutter is shown more particularly in Fig. 13. By means of the shafts 57 and 58 the spindles are adjusted to properly space the work 63 shown in Fig. 13 to the desired extent. The cutter 37 and the two pieces of work 63 are all rotated as indicated by the arrows in Fig. 13. As the rotating cutter is moved toward the rotating work, the cutter is fed into the work slowly until the axis of the cutter aligns with the axes of the two pieces of work, at which time, the work is cut to size.

Figure 2:
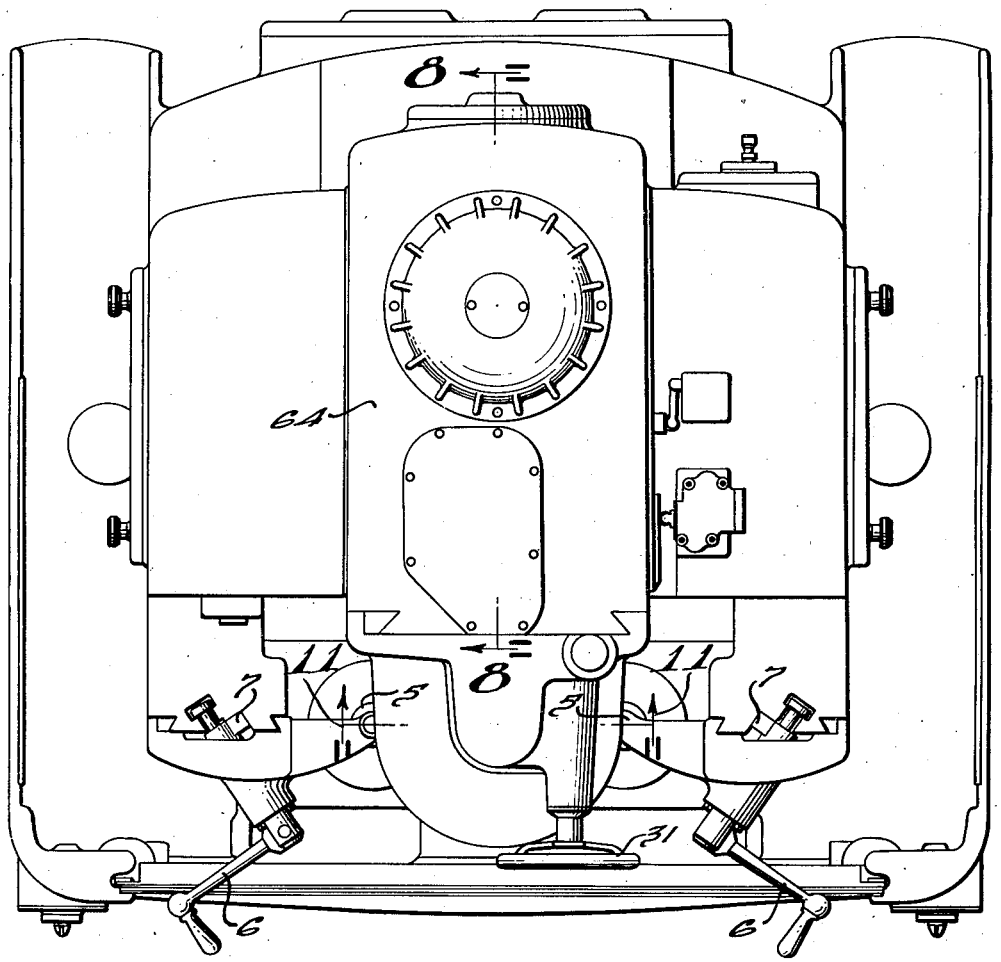
Fig. 2 is a top plan view of the milling machine.
Figure 4:
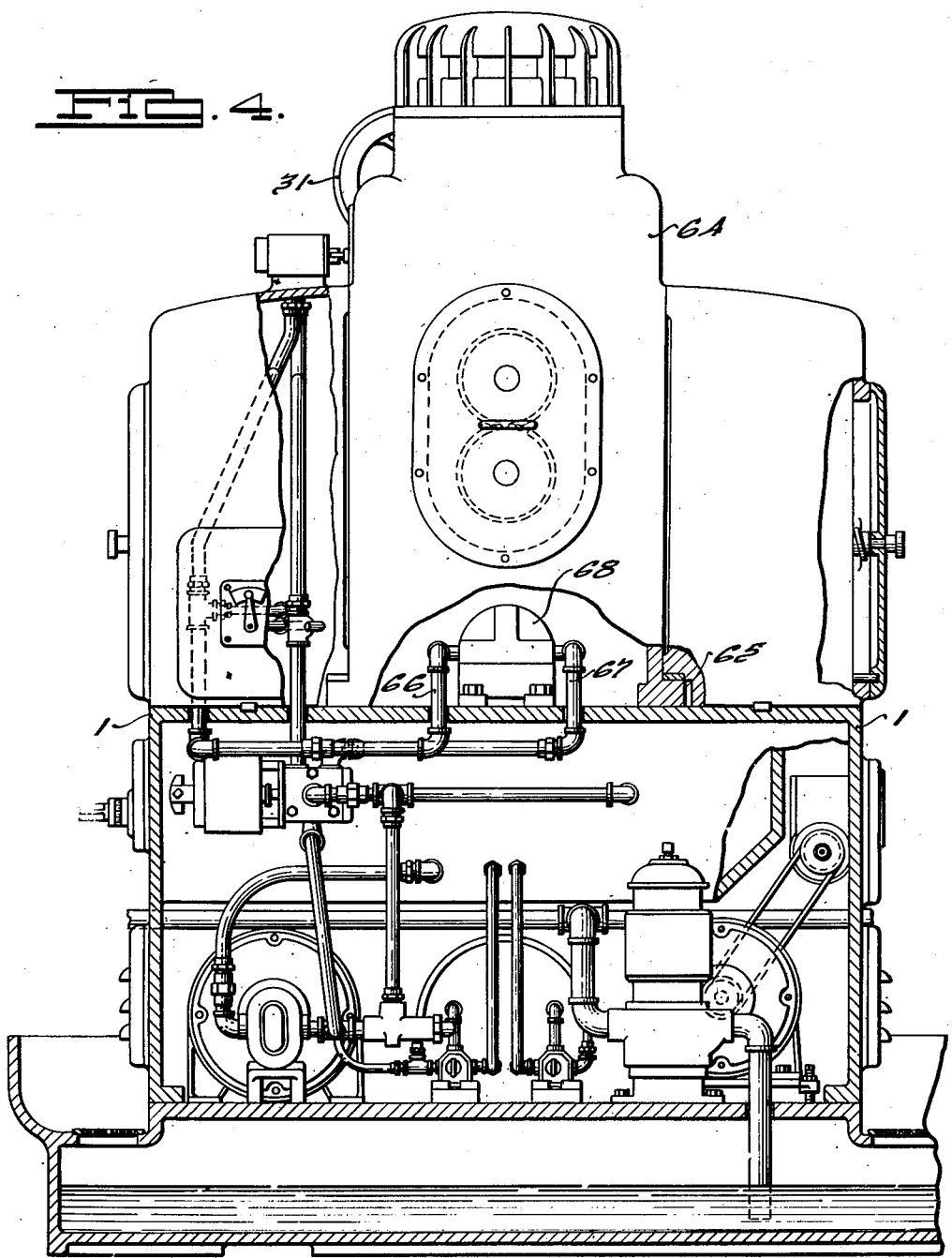
Fig. 4 is a rear elevation of the milling machine partly broken away to show the construction.

As will be understood from Figs. 2, 3 and 4, the entire cutter head assembly 64 is movable toward the work on the ways 65 shown in Fig. 4. This cutter head assembly is moved by means of the hydraulic conduits 66 and 67 shown in Fig. 4 which operate a hydraulic cylinder 68 to advance or retract the cutter head assembly. By this arrangement the cutter 37 together with the cutter head assembly on which it is supported may be moved from the position shown in dotted lines in Fig. 13 to that shown in full lines in the said figure. This provides a hydraulic feed for the cutter and cutter head assembly on the base.

From the foregoing description it becomes evident that by proper setting of the work and moving the cutter between the pieces of work while the pieces of work and cutter are rotating, that the work may be cut to exact size so that in production of cylindrical pieces of work after the machine is once set two pieces may be cut to size at each operation of the cutter and the cutter is advanced into the work until the axis of the cutter aligns with the axes of the work pieces to complete the cutting operation.

Having thus fully described my invention, its utility and mode of operation, what I claim and desire to secure by Letters Patent of the United States is—

1. In a milling machine, a base, a cutter head assembly movable horizontally on the base, a rotatable cutter carried by the cutter head assembly and movable therewith, a pair of spindle assemblies slidably mounted on the base and movable horizontally, transversely to the movement of the cutter head assembly, means for adjusting the position of the spindle assemblies horizontally, means for holding a piece of work on each spindle assembly, means for rotating the spindles and work, the arrangement being such that as the rotating cutter is moved between the rotating pieces of work the work is cut to size.

2. In a milling machine, a base, a pair of work holding spindles rotatably mounted on the base, means for adjusting the spindles toward or away from each other horizontally, means for mounting a piece of work on each spindle, a cutter head assembly, a cutter rotatably mounted in the cutter head assembly, means for rotating the cutter and spindles and means for moving the cutter head assembly to move the cutter between the pieces of work.

3. In a milling machine, a cutter, means for rotating the cutter, means for moving the cutter transverse to its axis during rotation thereof, a plurality of spindles adjustable transversely in relation to the path of travel of the cutter, means for rotating the spindles in the opposite direction to the rotation of the cutter, a piece of work mounted on each spindle and rotatable therewith, the cutter being movable transversely to its axis between the pieces of work to machine the same.

4. In a milling machine, a cutter, means for rotating the cutter, means for moving the cutter transversely to its axis during rotation thereof, a plurality of spindles adjustable in relation to the path of travel of the cutter, a piece of work mounted on each spindle and rotatable with the respective spindle, the cutter being movable transversely to its axis between the pieces of work to machine the same.

5. In a milling machine, means for supporting two pieces of work in spaced relation, means for rotating the work, a cutter, means for rotating the cutter and means for moving the cutter between the pieces of work, said cutter beginning its cutting operation upon contact with the pieces of work and completing the cutting operation when the axis of the cutter reaches a line between the axes of the two pieces of work.

6. In a milling machine, a cutter, means for rotating the cutter, a pair of work holding spindles each arranged to receive a piece of work, means for rotating each spindle and work carried thereby and means for moving the cutter between the pieces of work, while in rotation to cut both pieces simultaneously.

7. In a milling machine, means for reducing the surface of a pair of pieces of work, means for rotating said surface reducing means, rotatable work holding means adjustable toward or away from the path of travel of said surface reducing means, and means for moving the surface reducing means between the pieces of work to reduce both pieces to the same extent.

8. In a milling machine, a base, a pair of work holding spindles rotatably mounted on the base and each adapted to receive a piece of work to be cut to size, means for adjusting the spindles horizontally, a rotatable cutter and means for moving the cutter between the pieces of work while they are rotating to simultaneously cut both pieces to the same extent.

9. In a milling machine, a rotatable cutter movable in a horizontal path, means for rotating the cutter, a pair of work holding spindles adjustable transversely to the path of movement of the cutter, means for adjusting the spindles to bring the work to the path of travel of the cutter and means for moving the cutter between the spindles to machine the pieces of work.

10. In a milling machine, a cutter, means for rotating the cutter, work holding means movable toward or away from the path of travel of the cutter, said work holding means including means for rotating the work and means for moving the cutter between the pieces of work while in rotation to cut both pieces to the same extent.

11. In a milling machine, work holding means arranged to support two pieces of work in spaced relation, means for rotating the work, a cutter, means for rotating the cutter and means for moving the cutter between the two pieces of work to cut both pieces simultaneously.

RALPH E. CROSS.